(12) United States Patent
Mellander

(10) Patent No.: US 8,506,874 B2
(45) Date of Patent: Aug. 13, 2013

(54) FUEL TANK OPENING

(75) Inventor: Carl-Hugo M. Mellander, Ettlingen (DE)

(73) Assignee: TI Group Automotive, L.L.C., Auburn Hills, MI (US)

( * ) Notice: Subject to any disclaimer, the term of this patent is extended or adjusted under 35 U.S.C. 154(b) by 799 days.

(21) Appl. No.: 12/240,448

(22) Filed: Sep. 29, 2008

(65) Prior Publication Data

US 2010/0078842 A1    Apr. 1, 2010

(51) Int. Cl.
*B29C 39/02* (2006.01)

(52) U.S. Cl.
USPC .......................................................... 264/531

(58) Field of Classification Search
USPC .................................. 264/531, 533, 535, 537
See application file for complete search history.

(56) References Cited

U.S. PATENT DOCUMENTS

| 3,562,372 | A | 2/1971 | Schjeldahl et al. |
| 6,357,618 | B1 | 3/2002 | Kloess et al. |
| 6,537,056 | B1 * | 3/2003 | Omi et al. ..................... 425/526 |
| 6,645,421 | B1 | 11/2003 | Sanderson et al. |
| 7,097,445 | B2 | 8/2006 | Brandner et al. |
| 2005/0040567 | A1 | 2/2005 | Knueppel et al. |
| 2005/0046088 | A1 * | 3/2005 | Brandner et al. ............. 264/533 |
| 2009/0090724 | A1 * | 4/2009 | Childress et al. ........ 220/560.01 |

FOREIGN PATENT DOCUMENTS

| DE | 19607250 | 8/1997 |
| EP | 1632333 | 3/2006 |
| EP | 1759827 | 3/2007 |

OTHER PUBLICATIONS

EP Search Report Dec. 3, 2009 from TI Group Automotive Systems, L.L.C. EP 09011562.7-1523.

\* cited by examiner

*Primary Examiner* — Larry Thrower
(74) *Attorney, Agent, or Firm* — Reising Ethington P.C.

(57) ABSTRACT

Methods and apparatuses for blow molding a fuel tank with multiple concentric needles to form an opening in the fuel tank, and/or for calibrating the opening in the fuel tank as it cools.

23 Claims, 12 Drawing Sheets

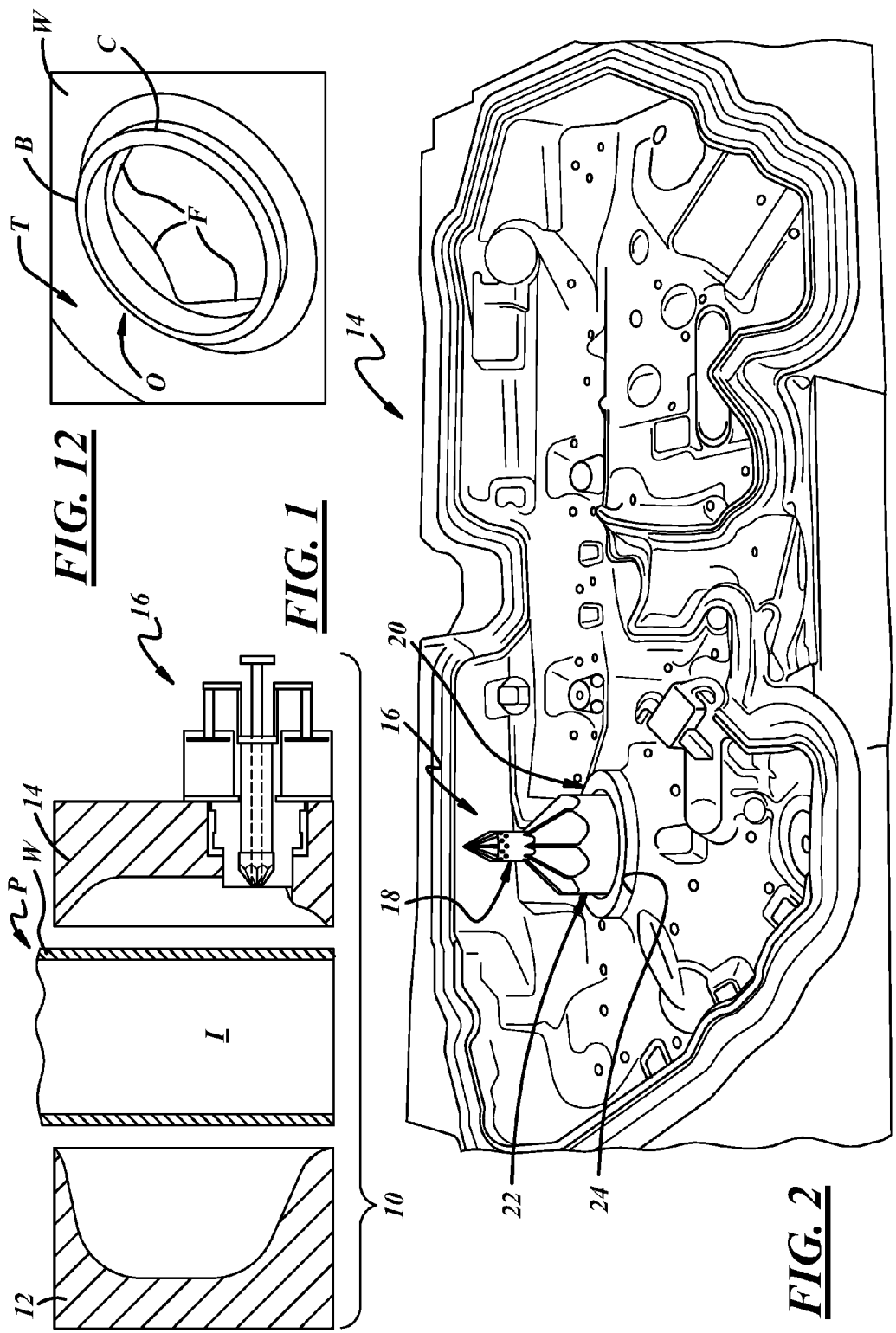

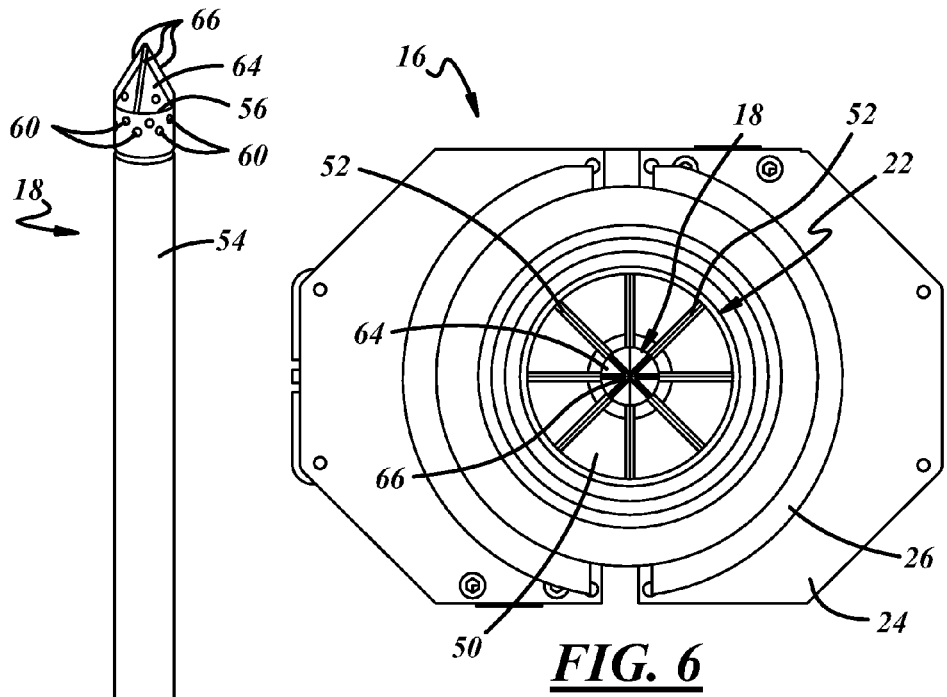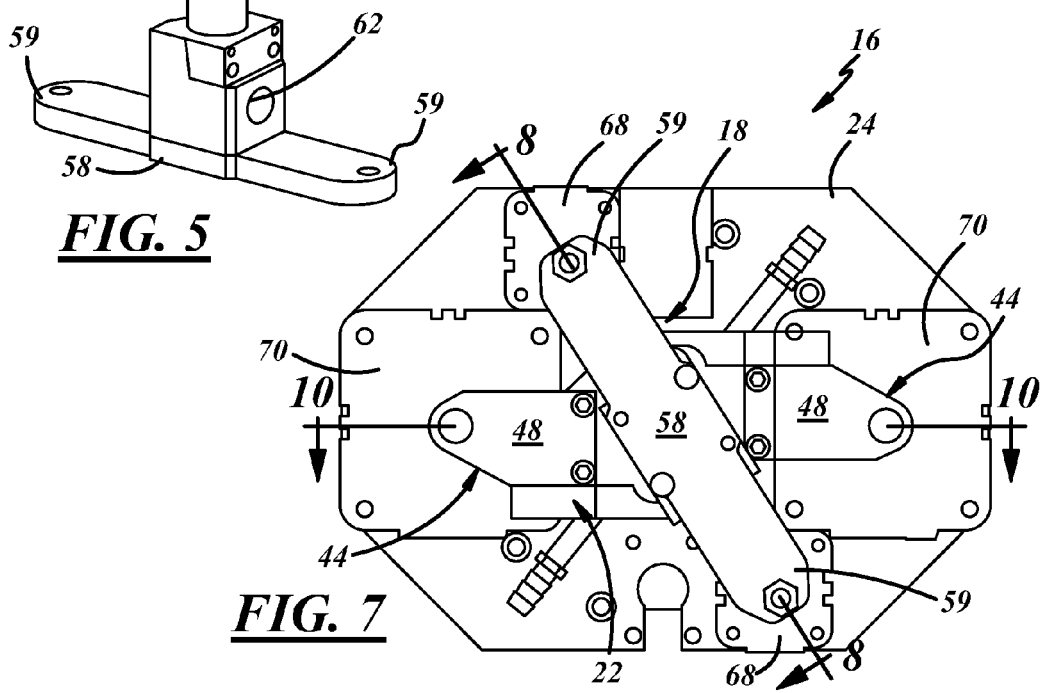

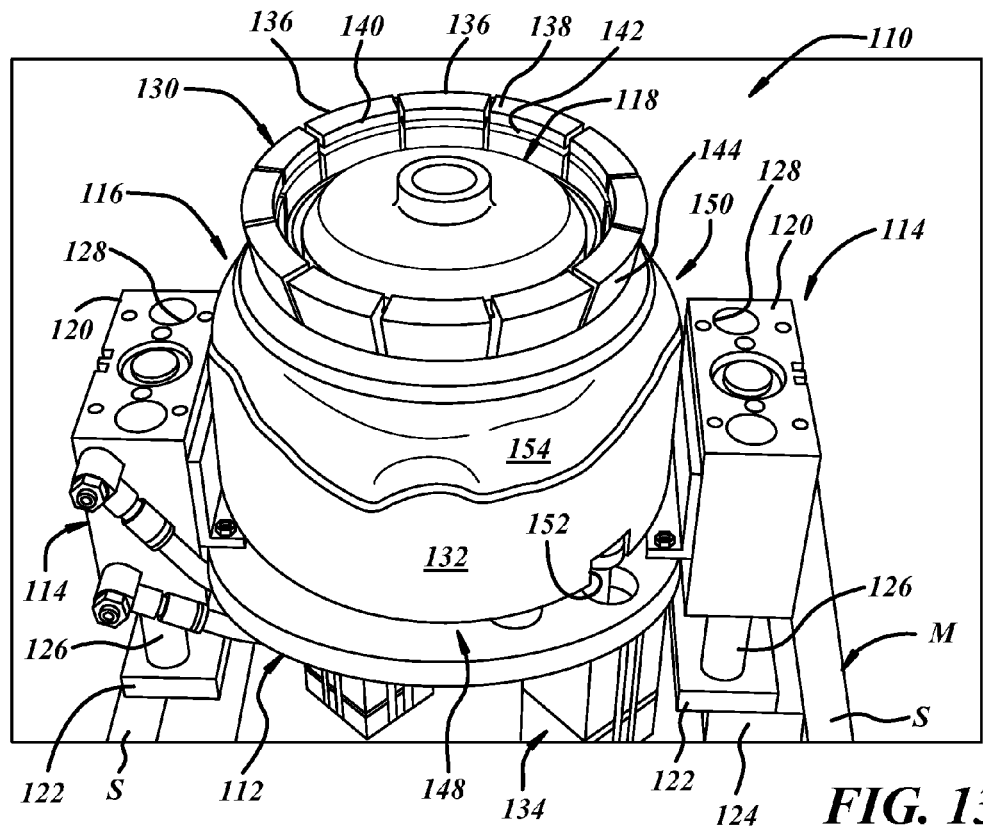
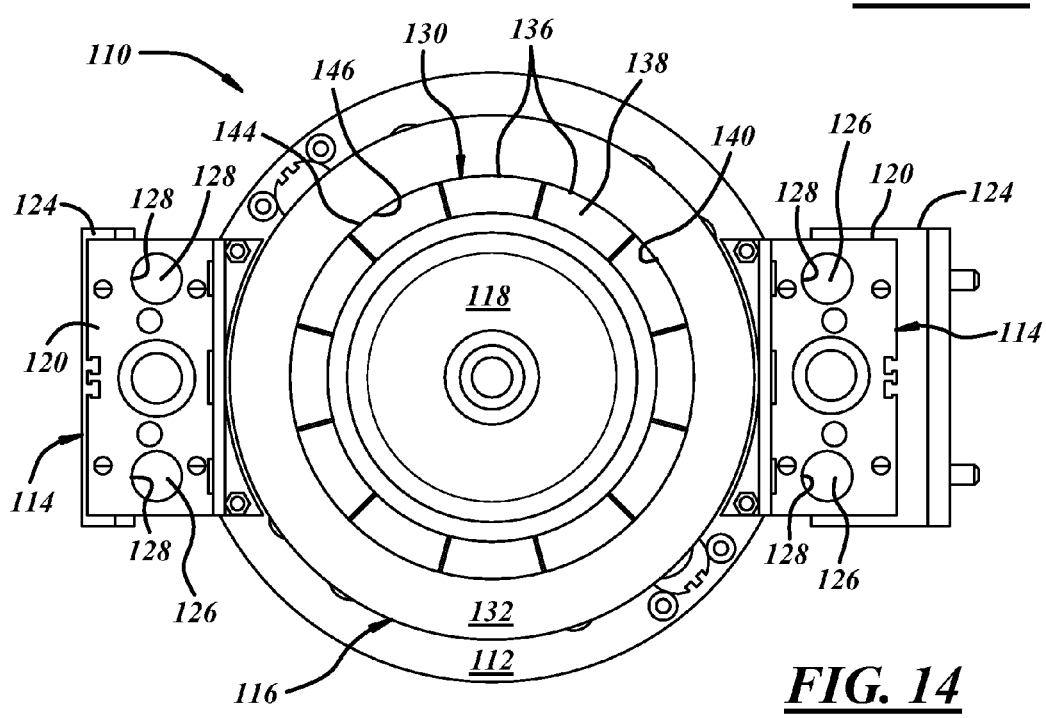
FIG. 13
FIG. 14

FUEL TANK OPENING

TECHNICAL FIELD

The present invention relates generally to manufacturing containers and, more particularly, to fuel tanks and methods and apparatuses for manufacturing fuel tanks.

BACKGROUND

Blow molding is a well known method for producing fuel tanks. In a typical fuel tank blow molding process, a generally cylindrical parison is extruded according to a size and an amount of material sufficient to create a fuel tank. The parison is placed into an open mold, a blow pin is extended up into an open end of the parison, and the mold closes. Portions of the parison are pinched between halves of the mold as the mold is closed, and pressurized gas is introduced into the interior of the parison through the blow pin to outwardly expand the parison into conformity with the shape of the mold cavity. After blowing, the blow pin is retracted and the molded tank is removed from the mold.

Downstream operations are then performed. For example, the molded tank is cooled at a cooling station, flashing is removed from the cooled tank at a trimming station, a hole is plugged in the tank where the blow pin was received, and openings are cut into the walls of the tank. For example, an opening may be cut into an upper wall of the tank to accommodate insertion of a fuel pump module and connection with a mounting flange of the module.

SUMMARY

A method of blow molding a fuel tank according to one implementation includes the following steps: positioning a parison within an open mold; closing the mold about the parison; piercing the parison with a first needle into communication with an interior of the parison; injecting a pressurized gas through the first needle into the parison to displace the parison against the mold to at least partially define the fuel tank; and piercing the parison with a second needle circumscribing the first needle to at least partially form an opening.

According to another implementation, an opening forming apparatus produces an opening in a fuel tank. The opening forming apparatus includes a first needle operable to pierce a parison wall and communicate pressurized gas into an interior of the parison, and a second needle circumscribing the first needle and operable to further pierce the parison wall to at least partially define the opening.

According to a further implementation, a method of manufacturing a fuel tank includes receiving from an upstream molding operation a warm fuel tank having an opening including an aperture. Also according to the method, the opening of the warm fuel tank is engaged with an opening calibration device, and the warm fuel tank is allowed to cool. Further according to the method, the opening calibration device is controlled while engaged to the opening of the warm fuel tank and as the warm fuel tank cools to control at least one parameter of the opening.

According to an additional implementation, a fuel tank calibration apparatus to calibrate an opening of a warm fuel tank includes a gripping device to hold at least a portion of the warm fuel tank that at least partly defines the opening. The apparatus also includes an expanding device advanceable into an aperture of the opening of the warm fuel tank and expandable into contact with the warm fuel tank, wherein at least one parameter of the opening is controlled as the warm fuel tank cools.

At least some of the objects, features and advantages that may be achieved by at least certain embodiments of the invention may include providing an apparatus and method to produce an opening in a fuel tank that reduces scrap, provides increased precision in size, location, position, shape, orientation, roundness, concentricity, and/or surface finish compared to prior art hole cutting operations downstream of blow molding operations; and providing a fuel tank that is of relatively simple design, economical manufacture and assembly, rugged, durable, reliable, and in service has a long useful life.

Of course, other objects, features and advantages will be apparent in view of this disclosure to those skilled in the art. Various other fuel tank manufacturing methods embodying the invention may achieve more or less than the noted objects, features or advantages.

BRIEF DESCRIPTION OF THE DRAWINGS

These and other objects, features and advantages will be apparent from the following detailed description of preferred embodiments and best mode, appended claims, and accompanying drawings in which:

FIG. 1 is a partial cross-sectional view of a parison positioned in an open mold carrying an opening forming apparatus;

FIG. 2 is a perspective view of the mold carrying the opening forming apparatus shown in FIG. 1, and shown including a first needle and a second needle;

FIG. 5 is a perspective view of a first needle of the opening forming apparatus shown in FIG. 3;

FIG. 6 is a top view of the opening forming apparatus of FIG. 3;

FIG. 7 is a bottom view of the opening forming apparatus of FIG. 3;

FIG. 12 is a perspective view of a portion of a fuel tank including an opening formed by the mold of FIG. 2;

FIG. 13 is a perspective view of an exemplary form of an apparatus to control one or more parameters of an opening of a fuel tank;

FIG. 14 is a top view of the calibration apparatus of FIG. 13;

DETAILED DESCRIPTION OF PREFERRED EMBODIMENTS

Referring in more detail to the drawings, FIG. 1 illustrates a blow mold 10 including mold sections 12, 14 movable between open and closed positions and shown in the open position. A parison P is disposed in the open mold 10 between the mold sections 12, 14 and includes a wall W and an interior I. The mold sections 12, 14 can be closed together to pinch the parison P therebetween. The mold section 14 includes an opening forming apparatus 16 that may be used to pierce the wall W of the parison P, inject pressurized gas into the interior I of the parison P to expand it into conformity with the mold 10, and form an opening that may be surrounded by a bead (not shown).

Figures 3, 4:
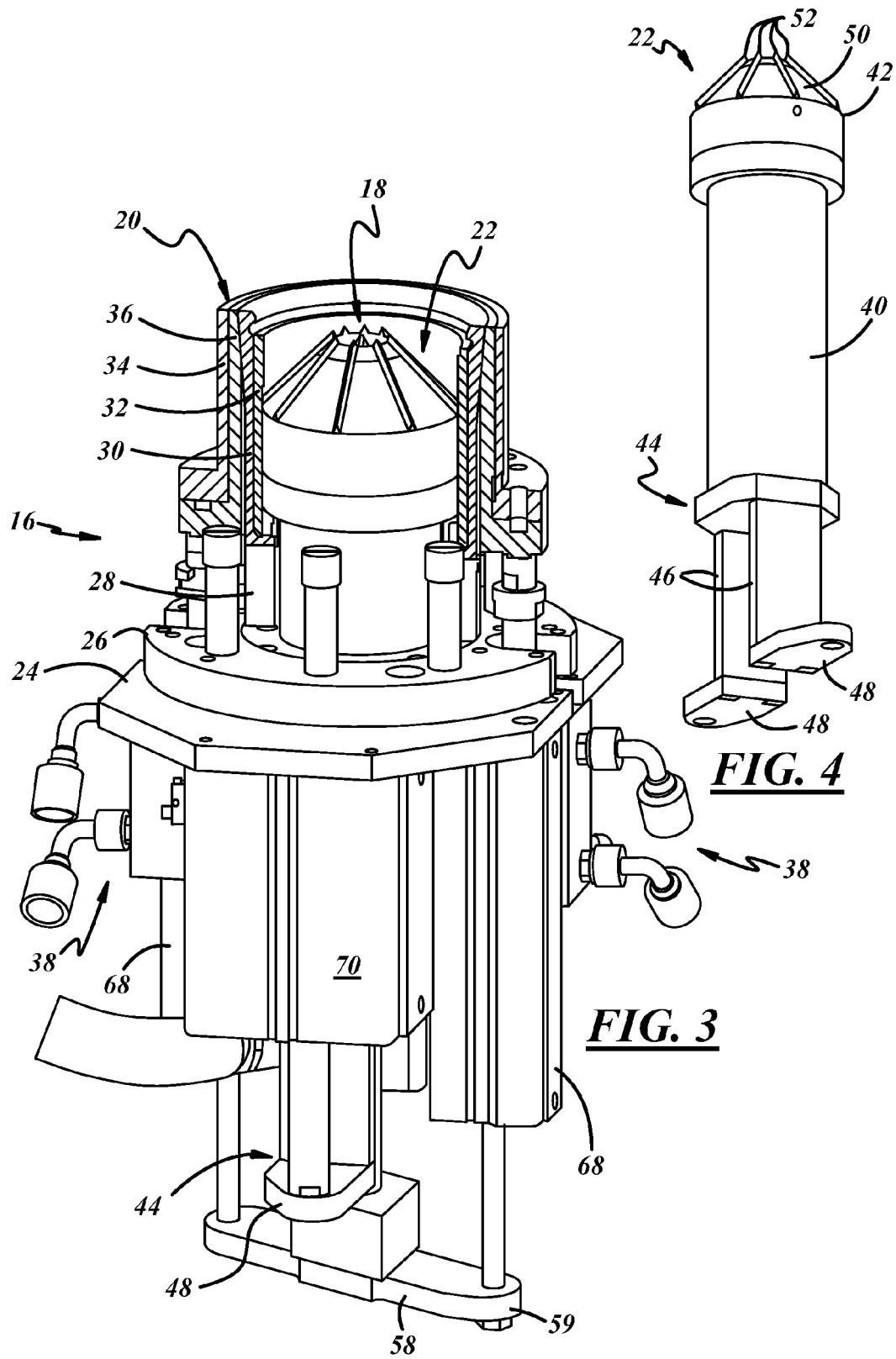
FIG. 3 is a perspective, partially sectioned view of the opening forming apparatus shown in FIG. 2.
FIG. 4 is a perspective view of a second needle of the opening forming apparatus shown in FIG. 3.

As shown in FIG. 2, the apparatus 16 may be extended such that a first needle 18 of the opening forming apparatus 16 may extend past a forward portion of a clamping ring assembly 20 of the apparatus 16, and such that a second needle 22 of the apparatus 16 may also extend past the clamping ring assembly 20 and circumscribes the first needle 18. The clamping ring assembly 20 may circumscribe both the first and second needles 18, 22 such that the second needle may be carried radially between the first needle and the clamping ring assembly. The first and second needles 18, 22 may also be retracted behind the forward portion of the clamping ring assembly 20, as shown in FIG. 3. The opening forming apparatus 16 may be disposed within an opening 24 or the mold section 14.

Referring to FIG. 3, the opening forming apparatus 16 may include a mold mount 26 to mount the apparatus 16 to the mold section 14 (FIG. 1) and support other portions of the apparatus 16 including the clamping ring assembly 20. The clamping ring assembly 20 may include a base 26 mounted to the mold mount 24, a cylindrical support 28 carried on the base 26, a deflectable bead sleeve 30 carried on the support 28, a fixed inner sleeve 32 carried by the support 28 within the deflectable bead sleeve 30, a fixed outer sleeve 34 carried by the base 26, and a movable drive sleeve 36 disposed between the fixed outer sleeve 34 and the deflectable bead sleeve 30. The clamping ring assembly 20 may also include clamping ring actuators 38 carried by the mold mount 24 on an opposite side thereof and operably connected to the movable drive sleeve 36. The actuators 38 may be, for example, hydraulically or pneumatically actuated rams or cylinders to advance and retract the movable drive sleeve 36. The movable drive sleeve 36 and the deflectable bead sleeve 30 may include cooperating tapers. Thus, when the actuators 38 advance the movable drive sleeve 36, a drive sleeve taper cooperates with a corresponding bead sleeve taper to deflect a portion of the bead sleeve 30 radially inwardly, and vice versa. The bead sleeve 30 may be composed of any suitable material such as steel, and may be segmented like a collet for enhanced radial deflection.

The first and second needles 18, 22 may extend through the mold mount 24. The second needle 22 is disposed within the cylindrical support 28 and, as shown in FIG. 4, may include a tubular shaft 40, a piercing head 42 carried on a forward end of the tubular shaft 40, and actuator linkage 44 carried on a rearward end of the tubular shaft 40. The actuator linkage 44 may include legs 46 and feet 48. The piercing head 42 may include a tapered surface 50 and one or more blades 52 to cut through the wall W of the parison P (FIG. 1).

The first needle 18 may be disposed within the second needle 22 and, as shown in FIG. 5, may include a tubular shaft 54, a piercing head 56 carried on a forward end of the tubular shaft 54, and actuator linkage 58 carried on a rearward end of the tubular shaft 54 and having opposed ends 59. The piercing head 56 of the first needle 18 may include blow holes 60 in communication with an interior passage of the first needle 18 to communicate pressurized gas into the interior I of the parison P (FIG. 1) such as via an inlet 62 of the needle 18. The piercing head of the first needle 18 may also include a conical or tapered surface 64 and one or more blades 66 to cut through the wall W of the parison P (FIG. 1). For example, as shown in FIG. 6, the first needle 18 may include four diametrically extending blades 66 (eight segments on its radius), and the second needle 22 may also include four diametrically extending blades 52 (eight segments on its radius). The first and second needles 18, 22 may instead individually include any desired number of blades, such as six, eight, or any other quantity.

The outer diameter of the second needle 22 may correspond to a desired size of an opening in a fuel tank. For example, the second needle 22 may be between 60 and 240 mm in diameter or any other suitable size. A more particular second needle diameter may be about 117 to 120 mm. The outer diameter of the first needle 18 may be determined in accordance with fluid flow rates and pressures used for a particular blow molding operation being carried out. For example, the first needle 18 may be between 15 and 60 mm in diameter or any other suitable size. A more particular first needle diameter may be about 30 to 35 mm. An exemplary range of ratios of second to first needle diameters may be about 3.5:1 to about 4.5:1, although any suitable ratio may be used.

Referring to FIGS. 3 and 7, the apparatus 16 may also include first and second actuators 68, 70 carried by the mold mount 24 on a rear side thereof for actuating the first and second needles 18, 22. The first actuators 68 for the first needle 18 are connected to the actuator linkage 58 adjacent the opposed ends 59 thereof, and the second actuators 70 are connected to the actuator linkage 44 of the second needle 18 at the opposed feet 48 thereof.

Referring to FIG. 1, the parison P may be pre-heated such as by an extruder (not shown) upstream of the open blow mold 10 to any suitable temperature. The parison P may be composed of any suitable material, for example, HDPE or other materials suitable for fuel tanks. The mold sections 12, 14 may then be moved from the open mold positions to closed positions to pinch off ends of the parison P.

Referring to FIG. 3, the clamping ring actuators 38 may be actuated in any suitable manner to advance the drive sleeve 36. Advancing the drive sleeve 36 deflects the bead sleeve 30 radially inwardly to define a cavity for a tank opening bead.

Figure 8:
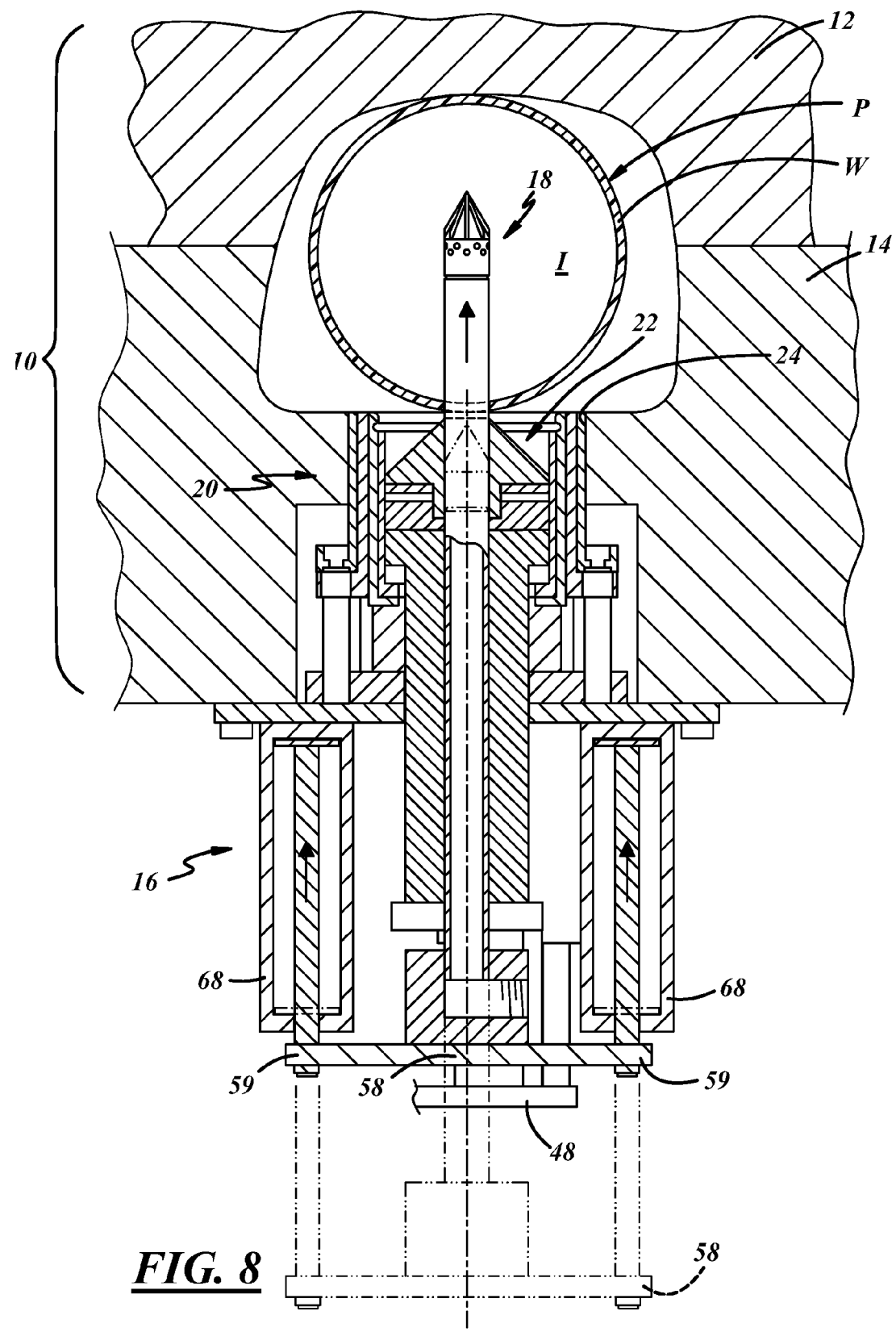
FIG. 8 is a cross-sectional view of the opening forming apparatus of FIG. 3, illustrating a first needle in an advanced position.

Referring to FIG. 8, the first actuators 68 may be energized to actuate the first needle 18, wherein the needle 18 advances and pierces the wall W of the parison P into the interior I thereof. At this time, pressurized air may be introduced through the first needle 18 to outwardly displace the parison P into conformity with the cavity of the mold 10, including the clamping ring assembly 20, which is advanced to define a bead cavity of the assembly 20.

Figure 9:
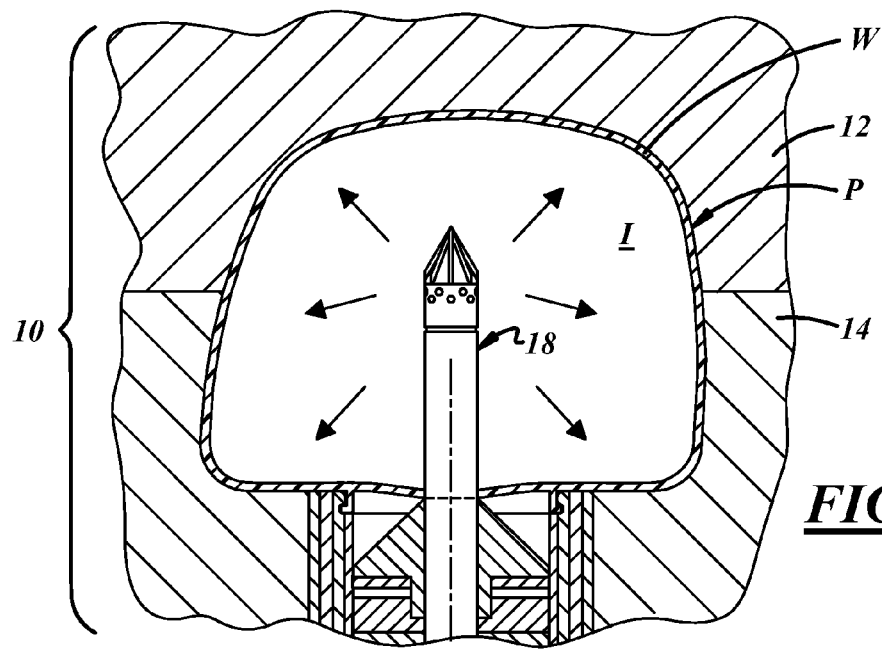
FIG. 9 is a cross-sectional view of the apparatus of FIG. 8, showing a parison inflated against an inside surface of a mold.

Referring to FIG. 9, a portion of the parison wall W may be displaced into the bead cavity to at least partially form a segmented or circumferentially continuous bead B of the opening. The bead B may be of any desired shape, diameter, thickness, and the like. For example, the bead B may be of substantially the same thickness as adjacent wall portions, may extend generally outward relative to adjacent wall portions, may be bulbous in cross-sectional shape, and/or may be threaded for cooperation with other components (not shown).

Figure 11:
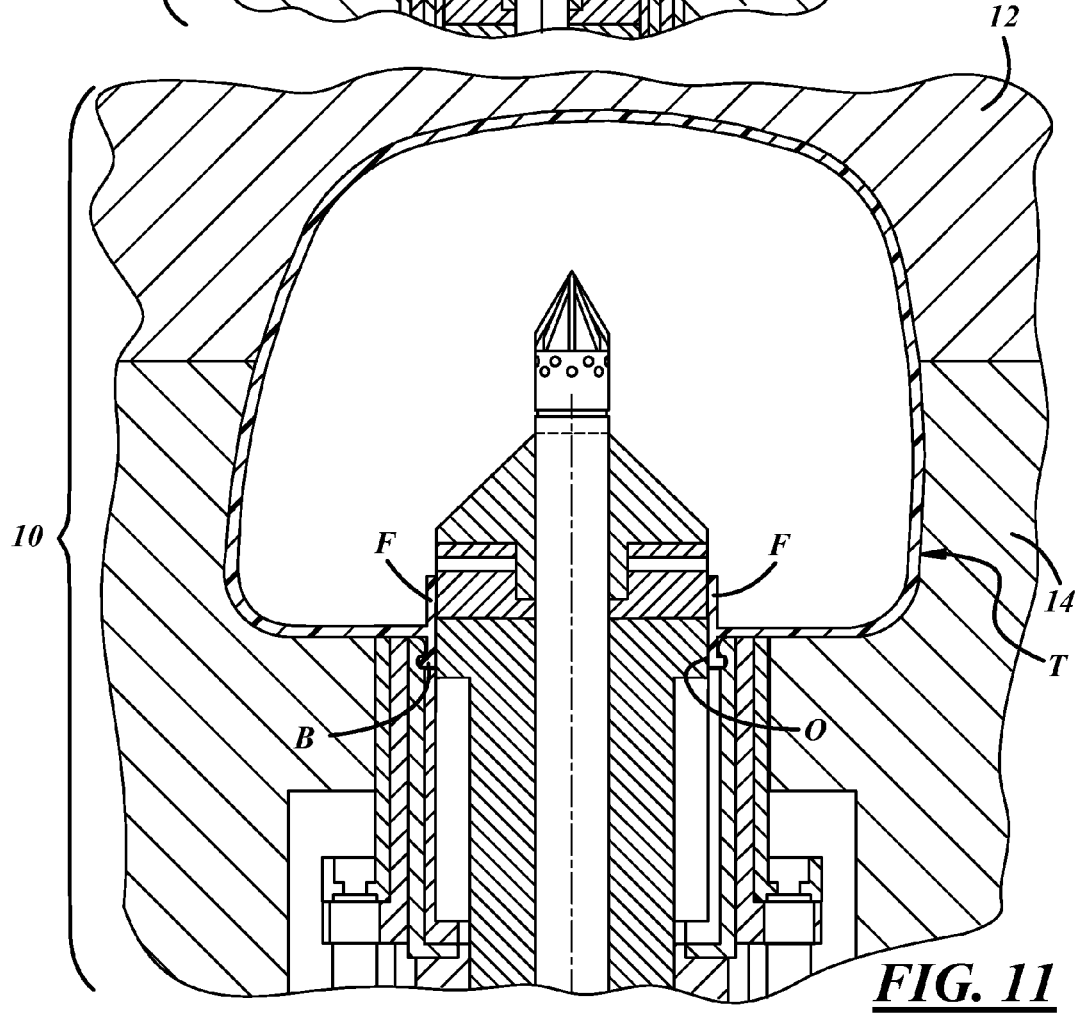
FIG. 11 is an enlarged view of the apparatus of FIG. 10.
Figure 10:
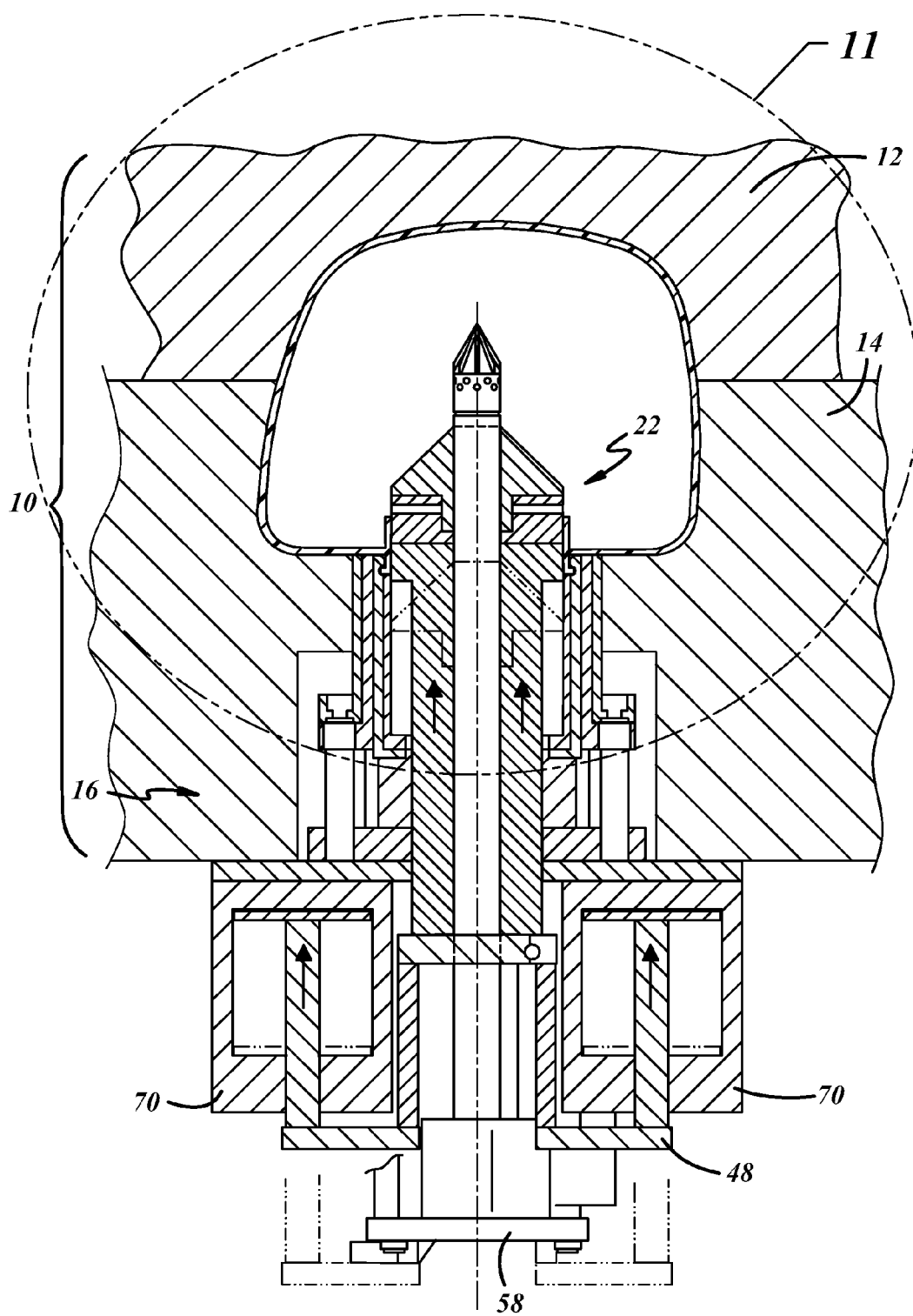
FIG. 10 is a cross-sectional view of the opening forming apparatus of FIG. 3, illustrating first and second needles in advanced positions.

Referring to FIG. 10, the second actuators 70 may actuate the second needle 22, wherein the needle 22 advances and further pierces a larger opening in the wall W of the parison P. As best shown in FIG. 11, the second needle 22 at least partially defines or forms an opening O that may include the bead B to define a beaded opening, and a plurality of flaps F of material or flash extending inwardly from the bead B. Then, the first and second actuators 68, 70 may actuate the first and second needles 18, 22 in a rearward direction such that the needles 18, 22 retract to their retracted positions.

Referring to FIG. 3, the clamping ring actuators 38 may be actuated to retract the movable sleeve 36 such that the bead sleeve 30 deflects radially outwardly to unclamp or release the newly formed bead B (FIG. 11). Additionally, the mold sections 12, 14 may then be retracted such that a newly formed fuel tank T may be removed from the mold 10.

Referring to FIG. 12, a fuel tank T may include the opening O, which may include an extension C that may be generally cylindrical, a bead B that may extend from the extension C, and flaps F that may extend interiorly from a wall W. The opening O also or instead may include just a hole or aperture in the wall W. In any case, the opening O may be used for insertion of a fuel pump module (not shown), connection of a fuel filler pipe, or any other suitable purposes.

By using the presently disclosed apparatus and method, openings in a fuel tank need not be cut in operations downstream from a blow molding operation. Instead, such openings may be formed during blow molding operations and with relatively precise size, location, position, shape, orientation, roundness, concentricity, surface finish, and/or any other suitable parameters. Also, little to no scrap may be produced by this method because no plugs need be cut from the fuel tank wall. Furthermore, integrity of the tank wall at the opening may be superior to that of cut openings, for example, because the wall thickness at the opening is set by the clamping ring assembly and the inside edge of the opening may be relatively smooth without rough edges. One or more of these results are unexpected at least for the reason that blow needle parison piercing operations conventionally require plugging or patching over, and hole cutting operations do not allow for control over wall thickness at the cut hole.

FIGS. 13-23 illustrate an exemplary embodiment of an apparatus for and method of calibrating one or more parameters of a fuel tank opening, such as the opening O of the fuel tank T of FIGS. 1 through 12. FIG. 13 shows a calibration apparatus 110 that may be carried by supports S of a machine M or a base. The machine M may include a fuel tank cooling station, or any other suitable station downstream of the aforementioned blow mold 10 of FIGS. 1 through 12. As used herein, the term calibrate may include setting or controlling a parameter.

Referring to FIG. 13, the apparatus 110 may include a base 112 supporting other components of the apparatus 110, and base actuators 114 between the machine supports S and the base 112 to move the apparatus 110 relative to the machine M. The apparatus 110 includes a fuel tank opening calibration device that may be a fuel tank gripping device 116 carried by the base 112 that may grip and pull a fuel tank, and an expanding device 118 carried by the base 112 to be received within an aperture of a fuel tank to control one or more parameters of the aperture.

Referring in general to FIGS. 13 through 16, the base 112 may be a mounting plate, may include any quantity of apertures, threaded holes, flats, or any other suitable features, and may be composed of metal. Also, the base 112 may be round as shown, or any other suitable shape.

The base actuators 114 may be hydraulic, pneumatic, electromechanical, or any other suitable types of devices to advance and retract machine components. In one example, the actuators 114 may include blocks 120 coupled to the base 112 and piston plates 122 coupled to the machine supports S. The blocks 120 and plates 122 may be coupled to the supports S by, for example, fastening, welding, or any other suitable means. Adapters 124 may be used in coupling the actuators 114 between the machine M and the base 112, and may include angle brackets, plates, or the like. The actuators 114 may include pistons 126 disposed in cylinders 128 of the blocks 120 and may or may not include return springs (not shown), and any other lifter components.

Referring to FIGS. 13 and 14, the fuel tank gripping device 116 may include a collet 130 that may be radially movable to grip at least a portion of the opening O of the fuel tank T. The gripping device 116 may also include a device to actuate the collet 130 such as a cam ring 132 and one or more actuators 134 that may axially move to radially displace the collet 130 into engagement with the fuel tank.

The collet 130 may be used to calibrate one or more portions of the opening O, such as by contracting and/or pulling the extension C, compressing the bead B, or the like. The collet 130 may include a plurality of leaves 136 that may be defined by a unitary cylindrical component that is slotted, or by a plurality of individual components that are movably mounted, or by any other suitable configuration. In any case, the leaves 136 of the collet 130 may include tank engaging surfaces such as axial locating surfaces 138, radial surfaces 140, grooves 142 (FIG. 13) to engage the annular bead B on the extension C of the fuel tank T, and tapered surfaces 144 to engage the cam ring 132. In another form, shown in FIG. 24, a collet 230 may include leaves 236 having thread segments 242 to engage corresponding threads on an extension of a fuel tank. This form is suitable for use with fuel tanks having so-called mason jar openings.

Figure 15:
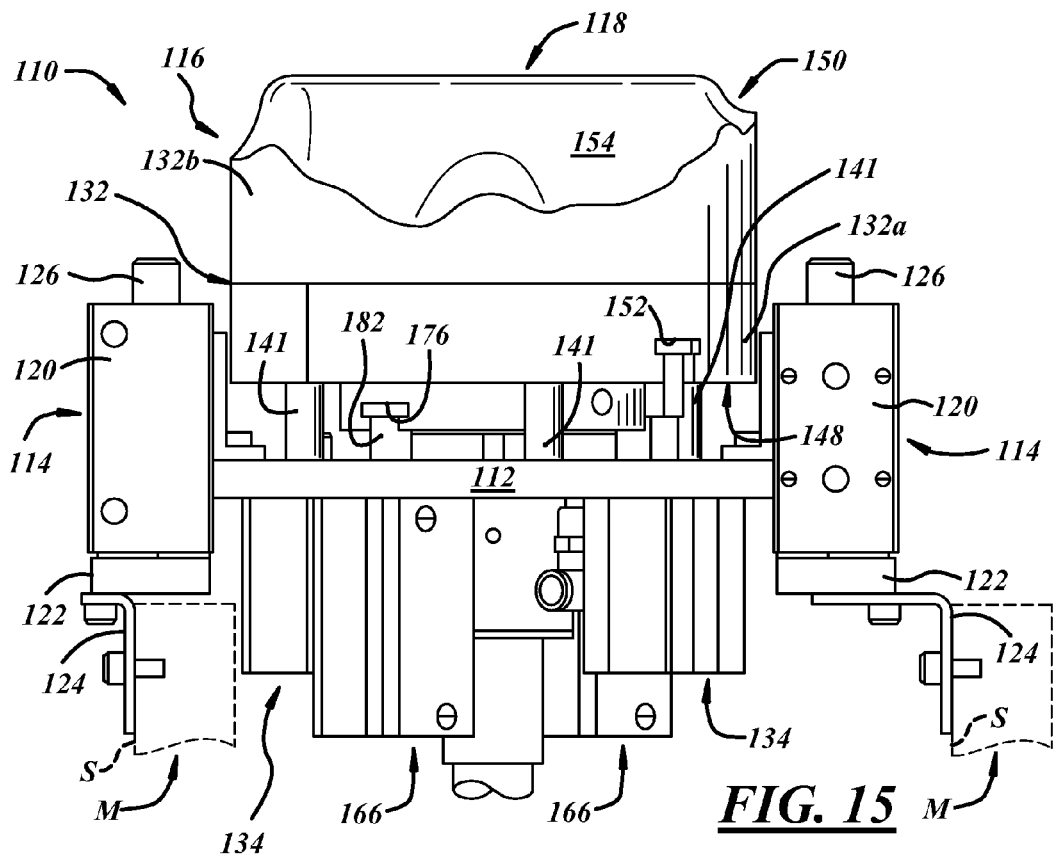
FIG. 15 is a side view of the calibration apparatus of FIG. 13.
Figure 16:
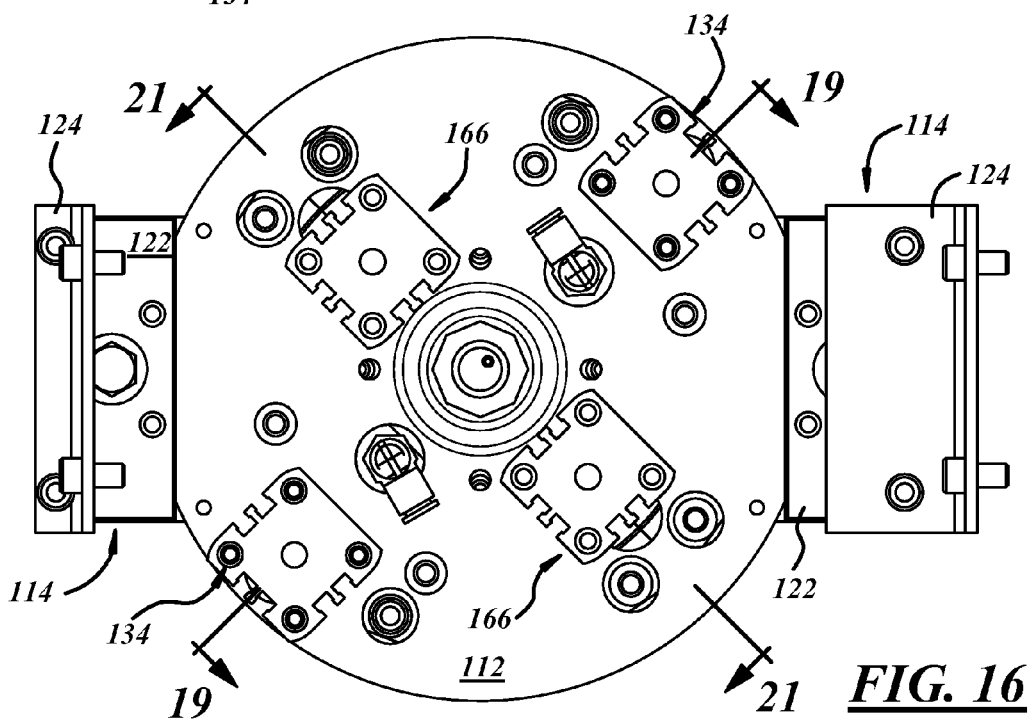
FIG. 16 is a bottom view of the calibration apparatus of FIG. 13.
Figure 17:
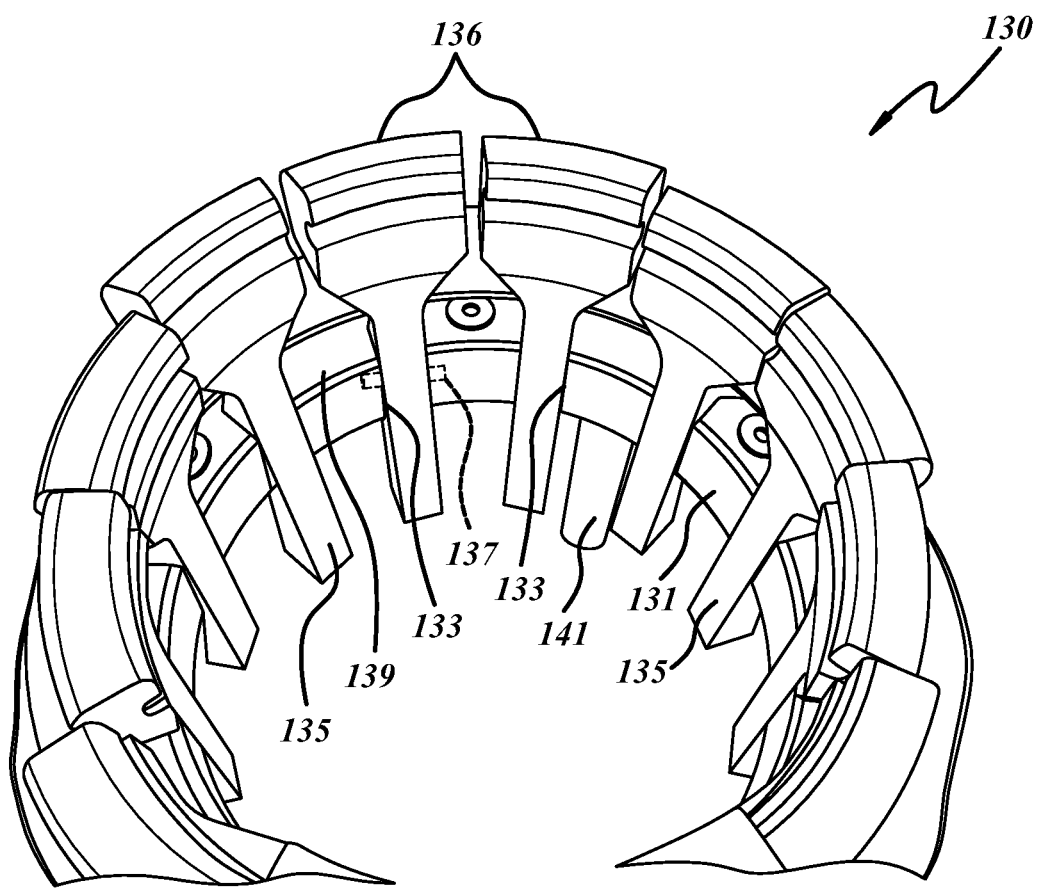
FIG. 17 is a top perspective view of collet segments and a holder of the calibration apparatus of FIG. 13.

Referring to FIG. 17, the collet 130 may also include a holder or mounting ring 131 having slots 133 to accept arms 135 of the collet leaves 136. The arms 135 may be pivotally coupled to the ring 131 in any suitable fashion. For example, pivots 137 may extend transversely through the arms 135 and may be accepted in corresponding recesses in an open top end of the ring 131. The pivots 137 may be retained thereto and/or covered by an annular cover plate 139, which may be coupled to the ring 131 in any suitable manner, for example, by fastening, welding, etc. The pivots 137 may be any pivoting device, for example, separate pins threaded to or otherwise passed through the arms 135, or may be integral pin portions of the arms 135. The ring 131 may be supported in any suitable manner, for example, by support posts 141, which may be fastened to the ring 131 and to the base 112 (FIG. 15).

Figure 18:
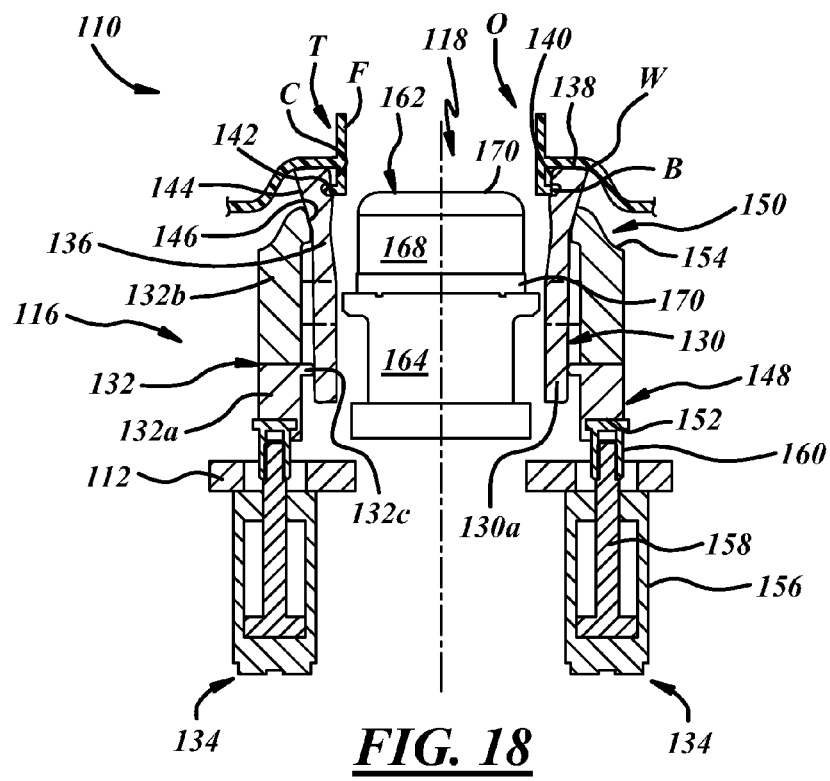
FIGS. 18 and 19 are cross-sectional views of the calibration apparatus of FIG. 13, taken along line 19-19 of FIG. 16.
Figure 19:
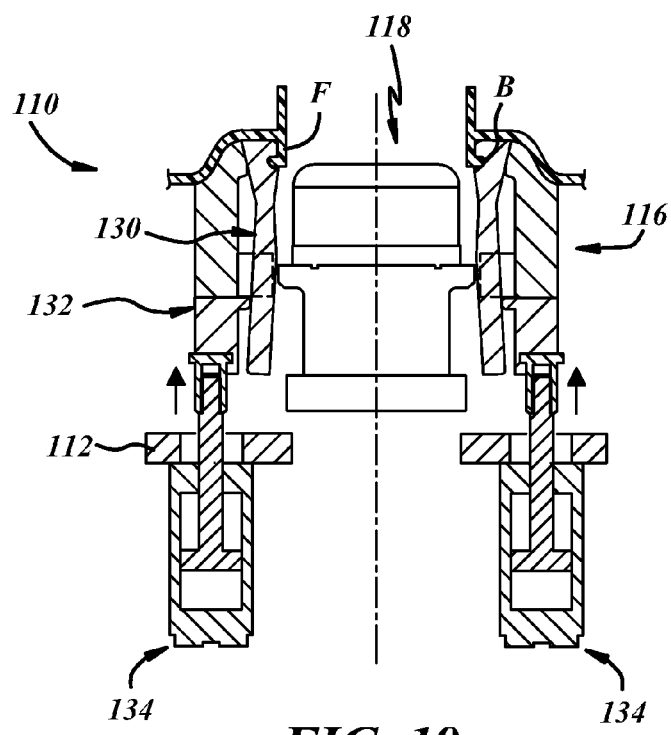
Figure 20:
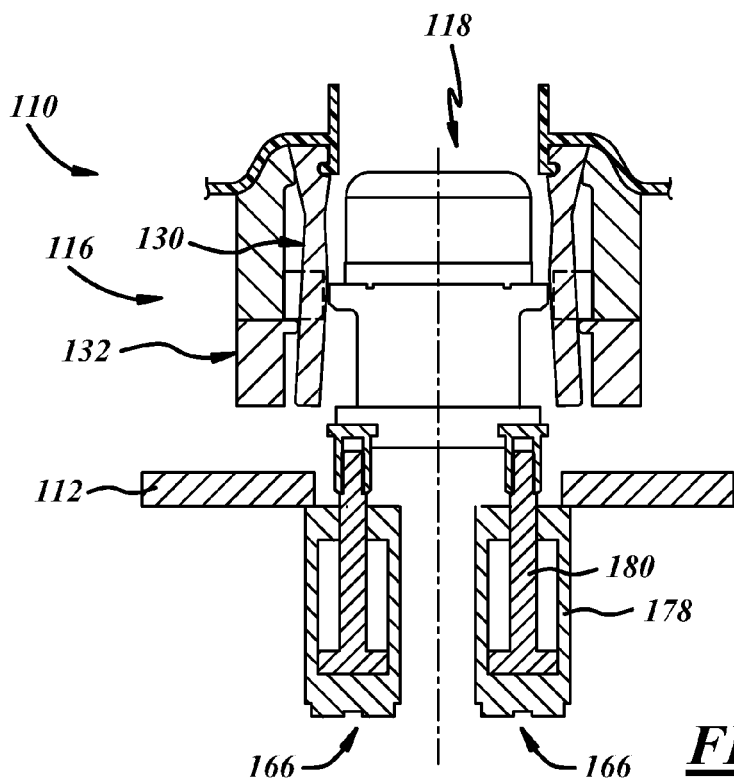
FIGS. 20 through 22 are cross-sectional views of the calibration apparatus of FIG. 13, taken along line 21-21 of FIG. 16.
Figure 21:
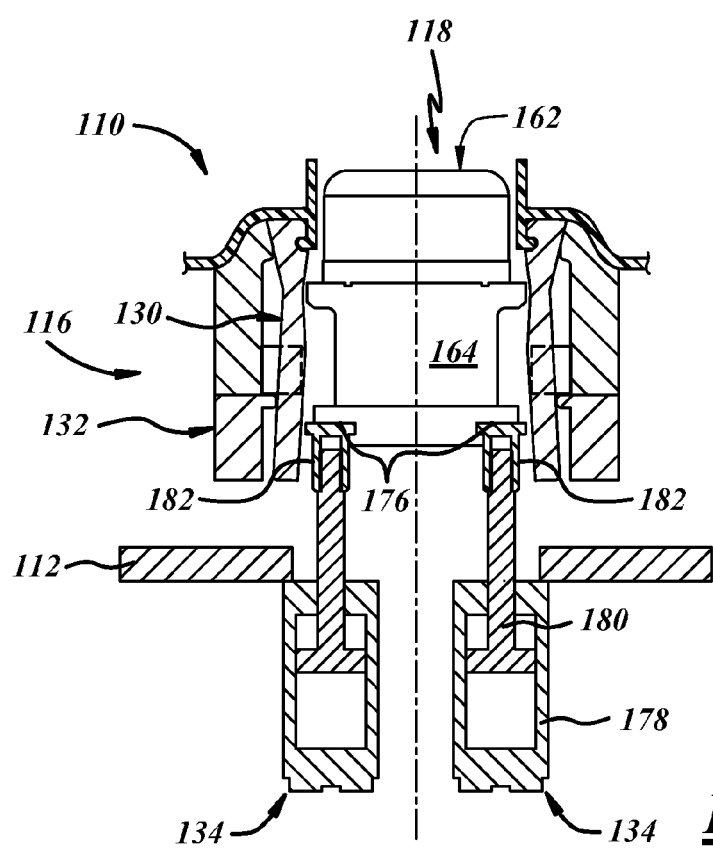

Referring to FIG. 18, the cam ring 132 may include a first ring 132a, and a second ring 132b supported on the first ring 132a. The first ring 132a may include an internal bead 132c, which may be continuous or segmented and is constructed to cooperate with corresponding portions 130a of the collet leaves 136. The bead 132c is sized and positioned to pivot the leaves 136 to an open position when the cam ring 132 is retracted.

As shown in FIGS. 13, 14, and 18, the cam ring 132 may include one or more corresponding tapered surfaces 146 to cooperate with the collet tapered surfaces 144 such that axial movement of the cam ring 132 may translate into radial displacement of the collet 130 to grip the fuel tank T. Accordingly, the cam ring 132 may be movably carried by the base 112 by guide rods or any other suitable arrangement, and may be moved by the cam ring actuators 134.

Referring to FIG. 18, the cam ring 132 may include a first end 148 proximate the base 112 and a second end 150 distal the base 112. The first end 148 of the cam ring 132 may include coupling features 152 such as T-slots as shown that may accept actuator hardware. The second end 150 may include a fuel tank locator 154, which may be a surface machined into the second end 150 of the cam ring 132, or may be a separate component coupled in any suitable manner to the cam ring 132. The locator 154 may be formed, machined, cast, or otherwise produced in any suitable manner to be complementary in shape to corresponding surfaces of a fuel tank. In other words, the locator 154 may be a "negative" of a portion of the fuel tank T.

The cam ring actuators 134 may advance (FIG. 19) and retract (FIG. 18) the cam ring 132 away from and toward the base 112. The cam ring actuators 134 may include hydraulic, pneumatic, electromechanical, or any other suitable types of devices to advance and retract components. In a specific example, the actuators 134 may include housings 156, and drive rods 158 that may be carried by the housings 156 and coupled to the cam ring 132 via adapters 160 as shown disposed in the coupling features 152 or in any other suitable manner.

The expanding device 118 may include an inflatable device 162 to engage the aperture of the fuel tank, a support 164 to carry the inflatable device 162, and actuators 166 coupled between the base plate 112 and the support 164 in any suitable manner to move the support 164 and the inflatable device 162 between a retracted position within the collet 130 and an advanced position within the fuel tank T.

The inflatable device 162 may include a generally cylindrical inflatable body 168 that may be configured for insertion in and sealing engagement with an aperture of a fuel tank. The body 168 may be a pneumatically expandable and resiliently flexible hollow bladder that may include a diameter and length suited to the general diameter of the aperture in which it is inserted. The inflatable device 162 may include other components such as end caps 170 coupled to the body 168, and may include any other suitable types of expandable devices.

Figure 22:
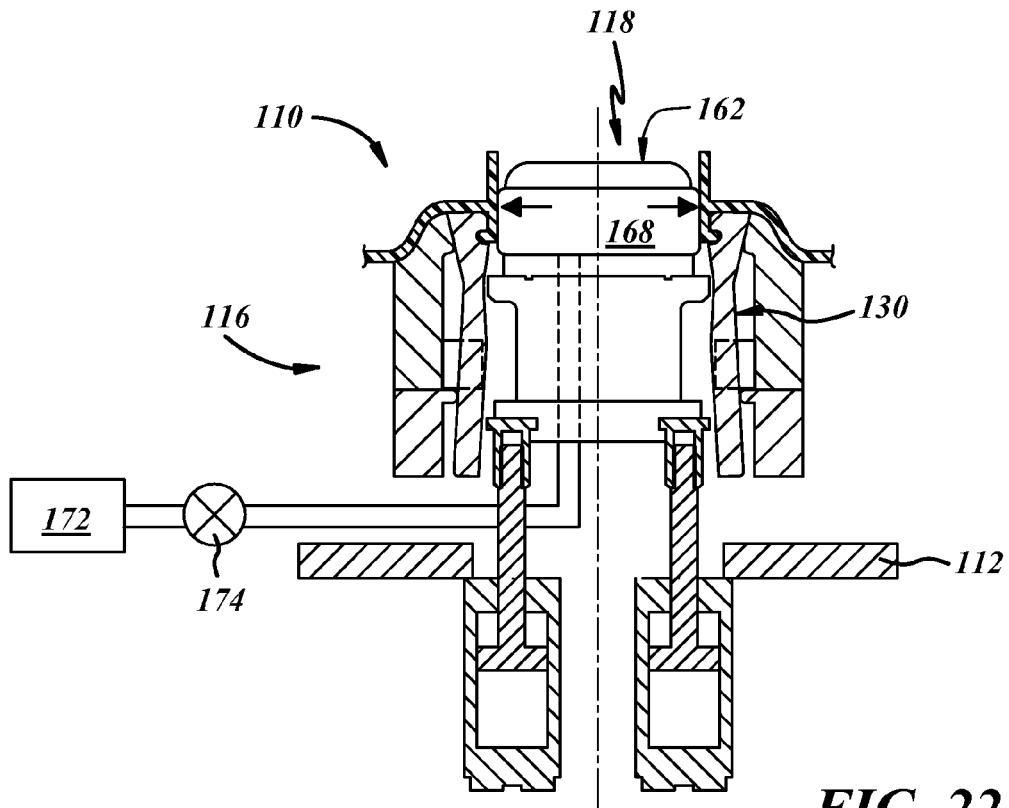
Figure 23:
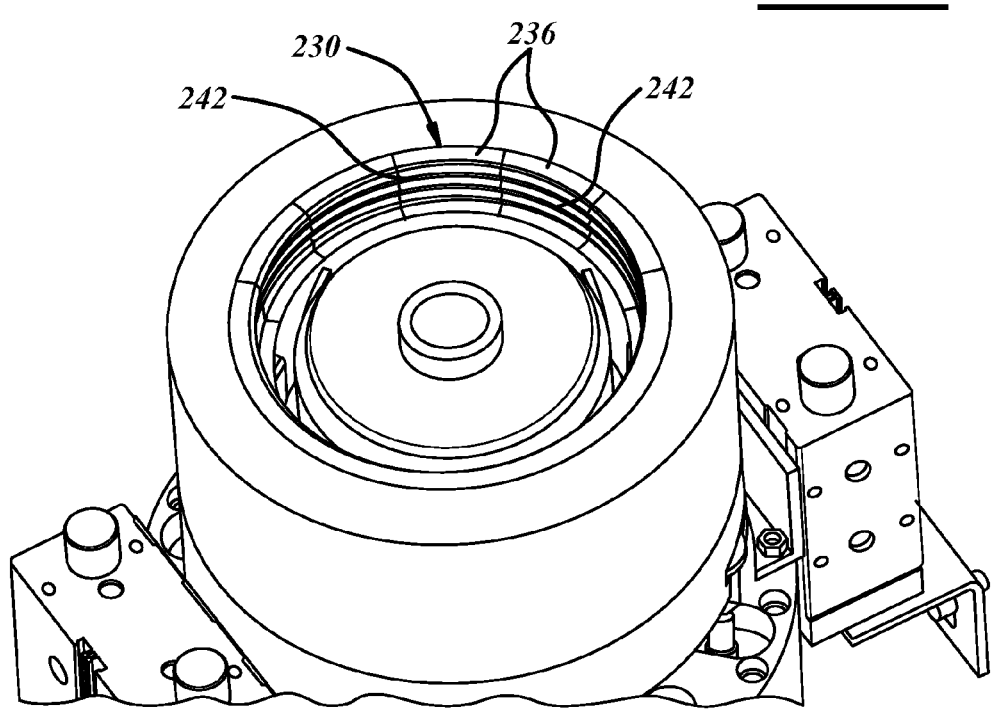
FIG. 23 is a perspective view of an exemplary form of a collet segment for use with a threaded fuel tank opening.

In the specific illustrated example in FIG. 22, the inflatable device 162 may be coupled in any suitable manner to a source of pressurized fluid 172 so as to inflate and thereby expand the body 168. A valve 174 may be coupled in fluid communication between the fluid source 172 and the body 168 for selective introduction of pressurized fluid to the body 168 to cause radial expansion of the body 168 into engagement of the peripheral surface of the body 168 with the fuel tank. Those of ordinary skill in the art will recognize that any suitable conduit may be used to connect the aforementioned devices, for example, hoses, pipes, fittings, etc. Skilled artisans will also recognize that the apparatus 110 may be operated and controlled by readily available machine control techniques, controllers, solenoid actuated valves, and/or the like.

Referring again to FIGS. 20 and 21, the support 164 may be a generally cylindrical component that may be fastened or otherwise coupled to the inflatable device 162 in any suitable manner. The support 164 may include coupling features 176 to accommodate actuator hardware.

The support actuators 166 may advance (FIG. 21) and retract (FIG. 20) the support 164 away from and toward the base 112. The support actuators 166 may include hydraulic, pneumatic, electromechanical, or any other suitable types of devices to advance and retract components. Accordingly, the actuators 166 may include housings 178, pistons 179, and drive rods 180 slidably carried by the housings 178 and coupled to the supports 164 via adapters 182 as shown disposed in the coupling features 176 or in any other suitable manner.

An exemplary method of manufacturing a fuel tank will be discussed in detail below. Also, portions of the method will be described in exemplary reference to FIGS. 13 through 22. The method steps may or may not be sequentially processed, and the method may encompass any sequencing, overlap, or parallel processing of such steps.

A warm fuel tank having an opening may be received, for example, from an upstream molding operation. For instance, and referring to FIG. 18, the fuel tank T produced by the blow molding operation discussed in conjunction with FIGS. 1 through 12 may be received, for example, at a water bath cooling station or leak test station. As used herein, the term warm includes any temperature of a fuel tank between room temperature at a low limit and its temperature from a molding operation at a high limit.

Then, an opening of a warm fuel tank may be engaged and calibrated. For example, an external surface on the wall W of the fuel tank T adjacent to the extension C may be used to locate and support the fuel tank T, and the fuel tank T may be gripped about the opening O for example about the extension C. More particularly, and referring to FIGS. 18 and 19, the cam ring actuators 134 may be pressurized to move the cam ring 132 relative to the collet 130 such that the bead 132c of the cam ring 132 may move out of contact with the leaves 136 to allow cooperation between the tapers 144, 146 to cause the collet 130 to collapse around a corresponding portion of the fuel tank T such as the extension C wherein the bead B may be received in the groove 142 of the collet 130. The base actuators 114 (FIG. 15) may be activated or deactivated to retract the collet 130 while the cam ring actuators 134 are activated or deactivated to advance the cam ring 132 so as to effectively pull the fuel tank T against the locator 154, thereby securing the position and height of the opening O in reference to the rest of the tank T and/or the apparatus 110. Thus, various aspects of the opening O may be calibrated such as squareness, shape, ovality, size, or the like of the extension C, bead B, and/or tank wall W surrounding the extension C.

Next, an expanding device may be advanced into an opening of a warm fuel tank. For example, referring to FIG. 21, the expanding device 118 may be advanced into the opening O of the fuel tank T.

Thereafter, an expanding device may be expanded into contact with portions of a warm fuel tank that at least partially define an opening. For example, referring to FIG. 22, the expanding device 118 may be pressurized so that the body 168 radially expands into contact, for example cylindrical surface contact or circular line contact, with at least an inner surface of the extension C of the fuel tank T (FIG. 18).

Subsequently, a warm fuel tank may be allowed to cool. For example, the warm fuel tank T may be air cooled, liquid cooled in a bath or shower, or cooled in any other suitable manner.

Finally, expansion of an expanding device in an opening of a warm fuel tank may be controlled while the fuel tank cools so as to control one or more parameters of the opening. For example, the amount of expansion of the expanding device 118 may be fixed according to a constant parameter setting such as a pressure level, or may be varied according to variable pressure levels during cooling.

By using the aforementioned apparatus and method, internal and external characteristics of openings may be formed in warm fuel tanks after blow molding operations with high precision in size, location, position, shape, orientation, roundness, concentricity, surface finish, and/or any other suitable parameters. As a fuel tank cools it changes in size and shape, but the calibration apparatus may be used to control one or more parameters of openings that may require a high degree of precision. Also, the calibration apparatus may be adapted to fit many different types of fuel tank openings, for example, access openings, beaded openings, threaded openings, clamping ring openings, or the like.

While the forms of the invention herein disclosed constitute presently preferred embodiments, many others are possible. It is not intended herein to mention all the possible equivalent forms or ramifications of the invention. It is understood that the terms used herein are merely descriptive, rather than limiting, and that various changes may be made without departing from the spirit or scope of the invention.

What is claimed is:

1. A method of blow molding a fuel tank, comprising:
   positioning a warm parison within an open mold;
   closing the mold about the parison;
   piercing the parison with a first piercing head of a first needle into communication with an interior of the parison;
   injecting a pressurized gas through the first needle into the parison to displace the parison against the mold to at least partially define the fuel tank;
   after injecting pressurized gas through the first needle into the parison, piercing the parison with a second separate piercing head of a second separate needle larger than the first head of the first needle and circumscribing the first head of the first needle by moving the second needle relative to the first needle to at least partially form an opening in the fuel tank larger than the portion of the first needle which pierced the parison; and
   removing the fuel tank from the mold with the larger opening at least partially formed therein.

2. The method of claim 1, further comprising:
   retracting the first and second needles, leaving the larger opening formed in the fuel tank;
   opening the mold; and
   removing the fuel tank with the larger opening formed therein from the mold.

3. The method of claim 1 wherein during the injecting step a portion of the parison is displaced against a clamping ring assembly circumscribing the first and second heads of the first and second needles to at least partially form a bead circumscribing the larger opening.

4. The method of claim 1, further comprising:
   advancing an expanding device into the opening of the fuel tank;
   expanding the expanding device into contact with portions of the fuel tank that at least partially define the larger opening formed in the fuel tank;
   allowing the fuel tank to cool; and
   controlling expansion of the expanding device while the fuel tank cools to control at least one of the size, location, position, shape, orientation, roundness, squareness, ovality, concentricity or surface finish of the opening while retaining the opening formed in the fuel tank.

5. The method of claim 4, further comprising:
   engaging the fuel tank around the opening.

6. The method of claim 5 wherein the engaging step includes:
   gripping the fuel tank around the opening; and
   pulling the fuel tank against a locator adjacent to the opening.

7. The method of claim 1 comprising:
   a clamping ring assembly circumscribing the second head of the second needle;
   when injecting the pressurized gas through the first needle into the parison to displace the parison against the mold to at least partially define the fuel tank, a portion of the parison is displaced against the clamping ring assembly to at least partially define a bead of the opening; and
   wherein the piercing of the parison with the second head forms inwardly extending flaps.

8. The method of claim 1 wherein the second needle includes a tubular shaft, the second piercing head is carried on a forward end of the shaft and has a tapered surface and a plurality of blades, and actuator linkage carried on a rearward end of the shaft.

9. The method of claim 1 wherein the first needle includes a shaft, the first piercing head is carried on a forward end of the shaft and has a tapered surface, blow holes, and a plurality of blades, and actuator linkage is carried on a rearward end of the shaft.

10. The method of claim 1 wherein the first and second heads each include a plurality of blades.

11. The method of claim 1 wherein a ratio of diameters of the second head to the first head ranges from about 3.5:1 to about 4.5:1.

12. The method of claim 1, further comprising:
    a clamping ring assembly operable to at least partially define a bead of the opening formed by the second head.

13. The method of claim 12 wherein the clamping ring assembly circumscribes the first and second heads, such that the second head is carried radially between the first head and the clamping ring assembly.

14. The method of claim 13, further comprising a mold mount mountable to a section of the mold and carrying the clamping ring assembly on one side of the mold mount.

15. The method of claim 14, further comprising at least one clamping ring actuator carried on an other side of the mold mount to actuate the clamping ring assembly.

16. The method of claim 15, further comprising at least one first needle actuator carried on the other side of the mold mount to actuate the first needle.

17. The method of claim 16, further comprising at least one second needle actuator carried on the other side of the mold mount to actuate the second needle.

18. The method of claim 1, further comprising:
    receiving from the mold the warm fuel tank having the at least partially formed larger opening;
    engaging the larger opening formed by the second head of the warm fuel tank with an opening calibration device;
    allowing the warm fuel tank to cool; and
    controlling the opening calibration device while engaged to the larger opening of the warm fuel tank and as the warm fuel tank cools to control at least one of the size, location, position, shape orientation roundness, squareness, ovality, concentricity or surface finish of the opening while retaining the opening in the fuel tank after the fuel tank has been cooled.

19. The method of claim 18 wherein the engaging step includes:
    the opening calibration device being a gripping device;
    gripping an extension of the larger opening; and
    pulling the fuel tank against a locator adjacent to the opening.

20. The method of claim 18 wherein the engaging step includes:
- the opening calibration device being an expanding device;
- advancing the expanding device into the larger opening of the warm fuel tank; and
- expanding the expanding device into contact with portions of the warm fuel tank that at least partially define the larger opening.

21. The method of claim 20 wherein the expanding step includes inflating an inflatable bladder to expand the expanding device.

22. The method of claim 21 wherein the controlling step includes controlling inflation of the inflatable bladder.

23. The method of claim 18 wherein the allowing the warm fuel tank to cool step includes liquid cooling the fuel tank.

\* \* \* \* \*

UNITED STATES PATENT AND TRADEMARK OFFICE
CERTIFICATE OF CORRECTION

PATENT NO. : 8,506,874 B2  
APPLICATION NO. : 12/240448  
DATED : August 13, 2013  
INVENTOR(S) : Carl-Hugo M. Mellander It is certified that error appears in the above-identified patent and that said Letters Patent is hereby corrected as shown below:

On the title page (73) Assignee should read: TI Group Automotive Systems, L.L.C.

Signed and Sealed this  
Twenty-second Day of October, 2013

Teresa Stanek Rea  
*Deputy Director of the United States Patent and Trademark Office*